(12) United States Patent
Someno

(10) Patent No.: US 7,299,482 B2
(45) Date of Patent: Nov. 20, 2007

(54) HIGH PRECISION POSITIONING APPARATUS

(75) Inventor: Yoshihiro Someno, Miyagi-ken (JP)

(73) Assignee: Alps Electric Co., Ltd., Ota-Ku, Tokyo (JP)

( * ) Notice: Subject to any disclaimer, the term of this patent is extended or adjusted under 35 U.S.C. 154(b) by 335 days.

(21) Appl. No.: 10/853,909

(22) Filed: May 25, 2004

(65) Prior Publication Data

US 2004/0252595 A1    Dec. 16, 2004

(30) Foreign Application Priority Data

Jun. 13, 2003    (JP) .............................. 2003-169463

(51) Int. Cl.
*G11B 17/028*    (2006.01)

(52) U.S. Cl. ..................................... 720/695

(58) Field of Classification Search ................. 720/745,
720/695; 235/476, 479; 365/112, 200; 385/18;
310/309
See application file for complete search history.

(56) References Cited

U.S. PATENT DOCUMENTS

| 5,130,521 | A | * | 7/1992 | Shino et al. ................. 235/476 |
| 5,536,988 | A | * | 7/1996 | Zhang et al. ................. 310/309 |
| 5,615,143 | A | * | 3/1997 | MacDonald et al. ......... 365/112 |
| 6,486,982 | B1 |  | 11/2002 | Davis .............................. 359/9 |
| 6,509,670 | B2 | * | 1/2003 | Jeong et al. ................. 310/309 |
| 6,819,822 | B2 | * | 11/2004 | Behin et al. ..................... 385/18 |
| 2004/0174757 | A1 | * | 9/2004 | Garverick et al. .......... 365/200 |

FOREIGN PATENT DOCUMENTS

JP    2001-093157    6/2001

* cited by examiner

*Primary Examiner*—Tianjie Chen
(74) *Attorney, Agent, or Firm*—Beyer Weaver LLP

(57) ABSTRACT

There is disclosed a high precision positioning apparatus capable of realizing accurate positioning of a recording medium with respect to an optical system by minute movement at a relatively low cost. The high precision positioning apparatus comprises a driving unit 1 for minutely moving a flat-plate shaped recording medium 10, which records/reproduces information using light, with respect to an optical system in an in-plane direction of the recording medium 10. The driving unit 1 comprises a frame-shaped unit body 2, a first drive frame 3 accommodated inside the unit body 2, and a second drive frame 4 accommodated inside the first drive frame 3 and fixed in the vicinity of a recording portion 11 of the recording medium 10. The first drive frame 3 freely moves with respect to the unit body 2 by means of micro-driving elements 5 in an in-plane direction of the recording medium 10, and the second drive frame 4 freely moves with respect to the first drive frame 3 by means of micro-driving elements 5 in an in-plane direction of the recording medium 10, in a direction substantially perpendicular to the direction in which the first drive frame 3 moves. Therefore, the recording medium 10 is minutely moved in an in-plane direction thereof.

4 Claims, 2 Drawing Sheets

DIRECTION Y
DIRECTION X   DIRECTION θ

HIGH PRECISION POSITIONING APPARATUS

BACKGROUND OF THE INVENTION

1. Field of the Invention

The present invention relates to a high precision positioning apparatus for positioning a recording medium with respect to an optical system in a holographic storage device with high accuracy, and more particularly, to a high precision positioning apparatus for accurately positioning a recording medium by roughly positioning the recording medium and then minutely moving the roughly positioned recording medium.

2. Description of the Related Art

Conventionally, as storage devices for a computer or the like, there has been widely used magnetic or optical recording media in which information is two-dimensionally written and/or from which information is two-dimensionally read. Examples of known magnetic storage devices include a floppy (registered trademark) disk, a hard disk, and so on, and examples of known optical storage devices include a compact disc (CD), a digital versatile disk (DVD), and so on. In order to meet demand for storage devices having a larger storage capacity, a remarkable advance in the recording density has been made hitherto. Also, development of storage devices using the principle of a hologram (hereinafter, referred to as holographic storage devices) is underway as means for realizing a further increased storage capacity.

A holographic storage device stores information on a hologram, which is formed by causing interference between encoded object light and reference light on a recording medium. Object light is radiated onto a recording medium in the form of two-dimensional digital data, and only reference light is radiated onto the recording medium when information is reproduced. Accordingly, a need arises for accurately positioning the optical system and recording medium of the object light and reference light. Such positioning is carried out by moving a flat-plate shaped recording medium in an in-plane direction while fixing the optical system in place. An example of such a holographic storage device is described in Patent Document 1.

[Patent Document]
Japanese Unexamined Patent Application Publication No. 2001-93157.

The conventional holographic storage devices that have been widely used are card- or disk-type recording media. In the case of a card-type recording medium, each slider is provided in each of the X and Y directions and the recording medium is moved with respect to the optical system using each slider so that the recording medium can be moved in mutually orthogonal X and Y directions in a plane thereof. In the case of a disk-type recording medium, a motor is coupled to the center of the recording medium for moving the recording medium in its circumferential direction, and a slider traversing the motor is provided for moving the recording medium in its radial direction.

However, the positioning apparatus of recording media in the conventional holographic storage device has the following drawbacks.

In order to randomly access data, a recording medium required to be largely moved in units of pages forming holograms. Meanwhile, in order to accurately position the recording medium with respect to the optical system, minute adjustment in positioning the recording medium is required. To perform minute movement, stepping of a driving motor or slider should be performed in a microscopic manner. If rough movement is performed on such driving system, a large load is undesirably applied to the system. In other words, it is difficult to make the rough movement of a recording medium compatible with the minute movement thereof, which results in high cost of the recording medium positioning apparatus.

SUMMARY OF THE INVENTION

The present invention has been attained to solve the above problems. It is therefore an object of the present invention to provide a high precision positioning apparatus capable of realizing accurate positioning of a recording medium with respect to an optical system by minute movement at a relatively low cost.

In order to accomplish the above object, a high precision positioning apparatus according to the present invention comprises a driving unit for minutely moving a flat-plate shaped recording medium, which records/reproduces information using light, with respect to an optical system in an in-plane direction of the recording medium, a recording portion of the recording medium being positioned in a predetermined position by the driving unit, wherein the driving unit comprises a frame-shaped unit body, a first drive frame accommodated inside the unit body, a second drive frame accommodated inside the first drive frame and fixed in the vicinity of the recording portion of the recording medium, and wherein the first drive frame freely moves with respect to the unit body in an in-plane direction of the recording medium by means of micro-driving elements, and the second drive frame freely moves with respect to the first drive frame by means of micro-driving elements in an in-plane direction of the recording medium, in a direction substantially perpendicular to the direction in which the first drive frame moves, so that the recording medium is minutely moved in an in-plane direction of the recording medium by moving the first drive frame and the second drive frame with respect to each other.

Further, in a high precision positioning apparatus according to the present invention, the first drive frame moves linearly and rotates with respect to the unit body by means of two micro-driving elements, and the second drive frame moves linearly and rotates with respect to the first drive frame by means of two micro-driving elements.

Moreover, in a high precision positioning apparatus according to the present invention, the first drive frame is connected to the unit body by elastic bodies, and the second drive frame is connected to the first drive frame through other elastic bodies.

Furthermore, in a high precision positioning apparatus according to the present invention, there is provided, the second drive frame includes air holes disposed substantially perpendicular to the recording medium, and the second drive frame is fixed to or isolated from the recording medium by the air aspirated or ejected through the air holes.

Furthermore, in a high precision positioning apparatus according to the present invention, the optical system includes an optical reference block that defines a predetermined position of the recording portion, and the optical reference block includes air holes disposed substantially perpendicular to the recording medium, and the optical reference block is fixed to or isolated from the recording medium by air aspirated or ejected through the air holes.

DESCRIPTION OF THE PREFERRED EMBODIMENTS

Figure 1:
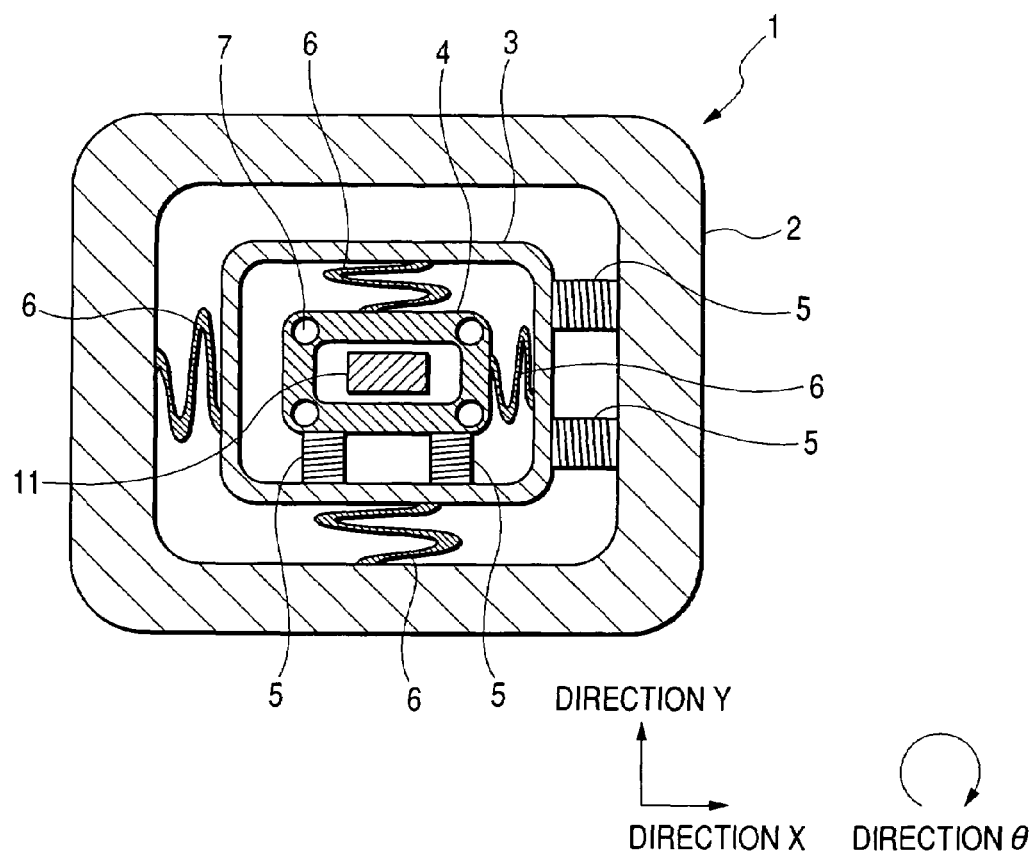
FIG. 1 is a plan view of a high precision positioning apparatus according to an embodiment of the present invention.
Figure 2:
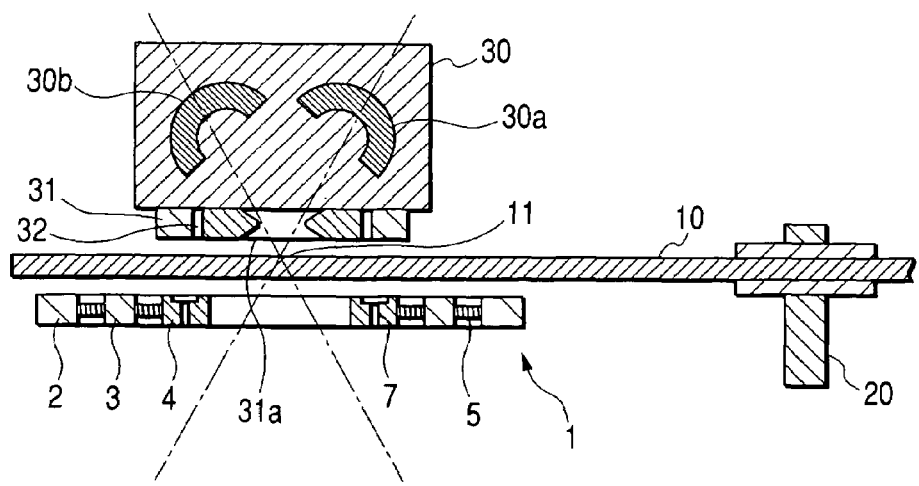
FIG. 2 is a sectional view illustrating a positional relationship between a recording medium, optical systems and the high precision positioning apparatus.

Preferred embodiments of the present invention will be described with reference to the accompanying drawings. FIG. 1 is a plan view of a high precision positioning apparatus according to an embodiment of the present invention. FIG. 2 is a sectional view illustrating a positional relationship between a recording medium, optical systems and the high precision positioning apparatus. As shown in the drawings, the high precision positioning apparatus in the present embodiment is used for minutely moving a flat-plate shaped recording medium 10 of a holographic storage device with respect to an optical unit 30 consisting of an object optical system 30a and a reference optical system 30b. That is, the high precision positioning apparatus accurately positions the recording medium 10 by minutely moving the recording medium 10 in X, Y and θ directions shown in FIG. 1 using a driving unit 1. The driving unit 1 includes a unit body 2 formed of a substantially rectangular frame, a-first drive frame 3 accommodated inside the unit body 2 and having a substantially rectangular shape, and a second drive frame 4 accommodated inside the first drive frame 3 and having a substantially rectangular shape. Also, rough positioning of the recording medium 10 is performed such that the recording medium 10 is moved in units of pages in the X and Y directions by means of a slider 20 connected thereto.

As shown in FIG. 2, the driving unit 1 has a substantially flat-plate shape as a whole, and is disposed opposite to a surface of the recording medium 10 facing the optical unit 30. In other words, the recording medium 10 is interposed between the driving unit 1 and the optical unit 30. The unit body 2 is fixed so as not to move with respect to the optical unit 30 in an in-plane direction of the recording medium 10. Also, the unit body 2, the first drive frame 3 and the second drive frame 4 that constitute the driving unit 1 are formed by an etching process using silicon. Here, a micro-fabrication technique using a material other than metal can also be employed.

The first drive frame 3 freely moves with respect to the unit body 2 in the X and θ directions by means of two micro-driving elements 5 that linearly extend or contract in the X direction, and elastic bodies 6 are provided in the X and Y directions, respectively, to resist operations of the micro-driving elements 5. Here, the micro-driving elements 5, extending or contracting by applying an electric field thereto, include piezoelectric elements or the like. Also, the elastic bodies 6, which are formed of leaf springs, suspend the first drive frame 3 to the unit body 2 and allow the first drive frame 3 to move in a stable manner. Here, the elastic bodies 6 are not limited to leaf springs, and any other kinds of springs or rubber may be used.

Since the two micro-driving elements 5 are provided to extend or contract in the X direction, the two micro-driving elements 5 are made simultaneously extend or contract by the same length so that the first drive frame 3 can linearly move in the X direction with respect to the unit body 2. Also, the two micro-driving elements 5 can rotate the first drive frame 3 in the θ direction with respect to the unit body 2 by allowing a difference between the extension and contraction of the two micro-driving elements 5 in the X direction.

Further, the second drive frame 4 freely moves with respect to the first drive frame 3 in the Y and θ directions by means of the two micro-driving elements 5 that linearly extend or contract in the Y direction, and elastic bodies 6 are provided in the X and Y directions, respectively, to resist operations of the micro-driving elements 5.

Since the two micro-driving elements 5 are provided to extend or contract in the Y direction, the two micro-driving elements 5 are made simultaneously extend or contract by the same length so that the second drive frame 4 can linearly move in the Y direction with respect to the first drive frame 3. In other words, with respect to the micro-driving elements provided in the first drive frame 3, the micro-driving elements 5 of the second drive frame 4 are provided so as to move the second drive frame 4 in a direction substantially perpendicular to the operations of the micro-driving elements provided in the first drive frame 3. Also, the micro-driving elements 5 can rotate the second drive frame 4 in the θ direction with respect to the first frame 3 by allowing a difference between the extension and contraction of the two micro-driving elements 5. Like the elastic bodies 6 provided between the unit body 2 and the first drive frame 3, the elastic bodies 6 of the second drive frame 4 suspend the second drive frame 4 to the first drive frame 3 and allow the second drive frame 4 to move in a stable manner.

Also, the second drive frame 4 is fixed to the peripheral edge of the recording portion 11 of the recording medium 10 to be in surface contact therewith. Since the second drive frame 4 is capable of moving with respect to the first drive frame 3 in the Y and θ direction and the first drive frame 3 is capable of moving with respect to the unit body 2 in the X and θ directions, the second drive frame 4 can move with respect to the unit body 2 in the X, Y and θ directions. That is to say, the recording medium 10 fixed to the second drive frame 4 can be moved with respect to the unit body 2 and the optical unit 30 in the X, Y and θ directions. The second drive frame 4 is provided with air holes 7 connected to a pump (not shown) substantially perpendicular to the recording medium 10. Air is aspirated or ejected through the air holes 7, thereby fixing the recording medium 10 to the optical reference block 31 or isolating the same therefrom.

The optical unit 30 includes an object optical system 30a and a reference optical system 30b. Also, an optical reference block 31 having an opening 31a is provided on the bottom surface of the optical unit 30. The bottom surface of the optical reference block 31 is flat, and becomes a reference in positioning the recording medium 10 with respect to the optical unit 30. The optical reference block 31 is provided with air holes 32 connected to a pump (not shown) so as to be in a substantially perpendicular direction to the recording medium 10. Air may be aspirated or ejected through the air holes 32, thereby fixing/isolating the recording medium 10 to/from the optical reference block 31.

The recording medium 10 according to the present embodiment is card-shaped and formed of a photorefractive material or a photopolymer material. The recording medium 10 forms a hologram by the object optical system 30a and the reference optical system 30b of the optical unit 30 on a plane thereof, and recording information. Also, the information is reproduced by the reference optical system 30b of the optical unit 30 and is then read. The information recorded on the recoding medium 10 is recorded on or reproduced from the recording medium 10 in the form of two-dimensional digital data. Thus, the information is recorded on or reproduced from the recording medium 10 in units of pages. In other words, information is recorded on the recording medium 10 in a state in which a plurality of pages is arranged in a row. Thus, for recording or reproducing of information, it is necessary to perform positioning by moving the recording medium 10 with respect to the optical unit 30 in units of pages in the X and Y directions.

Here, the operation of moving the recording medium 10 with respect to the optical unit 30 in units of pages is performed by a slider 20 connected to the recording medium 10. At this stage, positioning is achieved to an extent, that is, with an accuracy of about 10 μm. However, the positioning performed by the slider 20 is not accurate enough to record/reproduce the hologram. Thus, in this embodiment, accurate positioning (with an accuracy of 1 μm or less) of the recording medium 10 with respect to the optical unit 30 is performed in such a state by means of the minute movement of the recording medium 10 by the driving unit 1 in the X, Y and θ directions. In other words, the slider 20, which has been conventionally used for positioning of the recording medium 10, is used for rough positioning, and the high precision positioning apparatus according to the present invention, specifically, the driving unit 1, is used for accurate positioning. In such a manner, the conventional positioning apparatus and the positioning apparatus according to the present invention perform their intrinsic functions, independently.

Figure 3A:
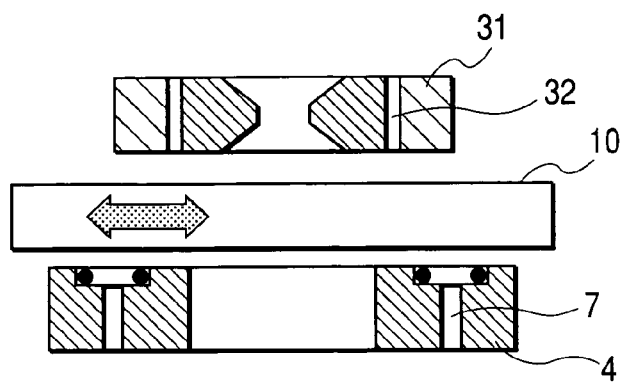
FIG. 3 illustrates a process of positioning a recording medium by the high precision positioning apparatus according to the present invention.

Next, a process of positioning the recording medium 10 with respect to the optical unit 30 will be described with reference to FIG. 3. FIG. 3 is a sectional view illustrating the relationship between the recording medium 10, the optical unit 30 and the high precision positioning apparatus, in which only the recording medium 10, the optical reference block 31 and the second drive frame 4 are schematically shown. FIG. 3A shows a state in which the recording medium 10 is roughly positioned by the slider 20. In this state, the recording medium 10 is spaced apart from the optical reference block 31 and the second drive frame 4, and the recording medium 10 is roughly moved in units of pages in the X and Y direction in a plane thereof by the slider 20 connected to the recording medium 10.

Figure 3B:
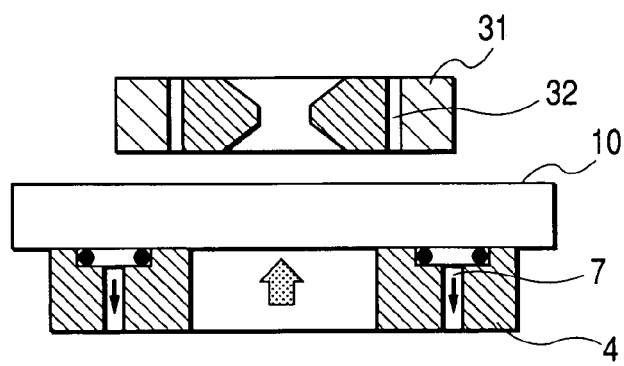

In a state in which the recording medium 10 is roughly moved by the slider 20, the recording portion 11 of the recording medium 10 is not accurately positioned with respect to the optical unit 30. Here, the positioning is performed in the plane of the recording medium 10. However, when the recording medium 10 is not accurately positioned in the X, Y and θ directions, recording/reproduction cannot be performed properly. Thus, accurate positioning of the recording medium is performed using the driving unit 1. FIG. 3B shows a process of fixing the driving unit 1 to the recording medium 10. That is, the whole driving unit 1 is pushed up to get closer to the recording medium 10 until it is brought into surface contact with the recording medium 10, and air is aspirated through the air holes 7 provided in the surface of the second drive frame 4 to fix the recording medium 10 thereto.

Figure 3C:
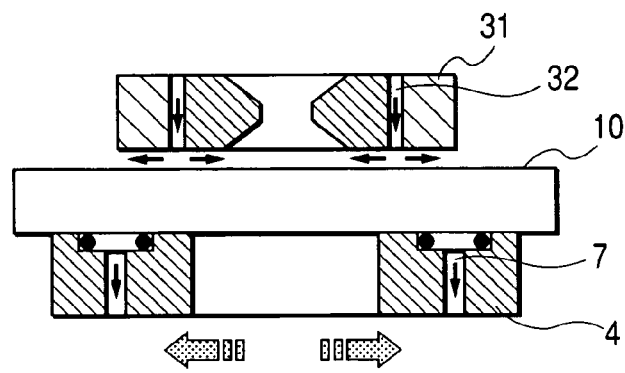

FIG. 3C shows a process of minutely moving the recording medium 10 by the driving unit 1. If the driving unit 1 is fixed to the recording medium 10, the driving unit 1 is further pushed up to get closer to the optical reference block 31. When the driving unit 1 gets closer to the optical reference block 31, air is ejected through the air holes 32 of the optical reference block 31. The air ejected through the air holes 32 of the optical reference block 31 forms an air layer on the surface of the recording medium 10, thereby preventing the recording medium 10 from contacting with the optical reference block 31 during the positioning process.

As described above, after the recording medium 10 is not allowed to directly contact the optical reference block 31, the driving unit 1 is actuated to position the recording medium fixed to the second drive frame 4 in the X, Y and θ directions. The recording medium 10 does not contact the optical reference block 31 while it is positioned by performing the positioning thereof in such a state, thereby avoiding scratching of the recording medium 10.

Figure 3D:
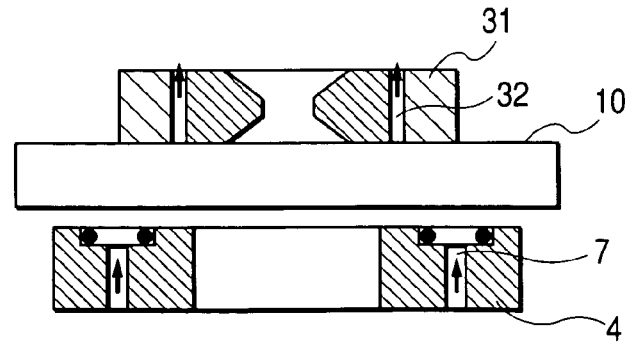

FIG. 3D shows a process of fixing the recording medium 10 to the optical reference block 31. When positioning of the recording medium 10 by the driving unit 1 is completed, ejection of air from the air holes 32 of the optical reference block 31 is stopped and aspiration of air is then started. Also, aspiration of air by the air holes 7 of the second drive frame 4 is stopped and ejection of air is started. By doing so, the recording medium 10 getting closer to the optical reference block 31 is isolated from the second drive frame 4 to be in surface contact with the optical reference block 31 and fixed thereto. In such a manner, the recording portion 11 of the recording medium 10 can be positioned with respect to the optical unit 30.

While the preferred embodiments of the invention have been described above, it will be recognized and understood that the invention is not limited thereto and various modifications may be made within the scope of the technical idea thereof.

While the present embodiment has shown that the air holes 7 and 32 are provided in the second drive frame 4 and the optical reference block 31, respectively, to aspirate or eject air, thereby fixing/isolating the recording medium 10 to/from the second drive frame 4 and the optical reference block 31, pins may be provided on the second drive frame 4, instead of the air holes, the pins capable of freely communicating in a direction perpendicular to the plane of the recording medium 10. The recording medium 10 may be brought into contact with the optical reference block 31 by pushing up the pins. With this arrangement, a pump for aspirating or ejecting air may not be provided, thereby further reducing the manufacturing cost.

Also, although the present embodiment has shown that the recording medium 10 has a card shape and the movement of the recording medium 10 in units of pages is performed in the X and Y directions, the shape of the recording medium 10 is not limited thereto, and the shape of a disk, such as a CD or DVD, can be employed. In the case where the recording medium 10 has a disk shape, in order to move the recording medium 10 in units of pages, a motor is connected to a central portion of the recording medium 10 and a slider traversing the motor in the X direction is provided. Linear motion and rotation of the recording medium 10 are performed using the motor and the slider, thereby roughly positioning the recording medium 10 with respect to the optical unit 30. Then, the driving unit 1 is configured in the same manner as in the present embodiment and accurately positions the recording medium 10 in the X, Y and θ directions. As described above, the driving unit 1 according to the present embodiment can also be applied to the disk-shaped recording medium 10.

As described above, the high precision positioning apparatus comprises a unit body, a first drive frame accommodated inside the unit body, a second drive frame accommodated inside the first drive frame and fixed in the vicinity of a recording portion of the recording medium. The first drive frame freely moves with respect to the unit body by means of micro-driving elements in an in-plane direction of the recording medium, and the second drive frame freely moves with respect to the first drive frame by means of micro-driving elements in an in-plane direction of the recording medium, in a direction substantially perpendicular to the direction in which the first drive frame moves. Thus, the high precision positioning apparatus according to the present invention can perform micro-positioning of a recording medium using mechanism different from a mechanism for moving a recording medium largely, that is, in units of pages, in a holographic storage device. Accordingly, the motor or slider performs rough positioning while ensuring a sufficiently high positioning accuracy of the recording medium, thereby reducing the cost.

Also, according to the high precision positioning apparatus of the present invention, the first drive frame moves linearly and rotates with respect to the unit body by means of two micro-driving elements, and the second drive frame moves linearly and rotates with respect to the first drive frame by means of two micro-driving elements, thereby accurately positioning the recording portion of the recording medium with respect to the optical system.

Further, according to the high precision positioning apparatus of the present invention, the first drive frame is connected to the unit body by elastic bodies, and the second drive frame is connected to the first drive frame through other elastic bodies so that the first drive frame can be suspended to the unit body, and the second drive frame can be suspended to the first drive frame, thereby forming a triple structure and operating the first drive frame and the second drive frame in a stable manner.

What is claimed is:

1. A high precision positioning apparatus having a driving unit for minutely moving a flat-plate shaped recording medium, which records/reproduces information using light, with respect to an optical system in an in-plane direction of the recording medium, a recording portion of the recording medium being positioned in a predetermined position by the driving unit, wherein the driving unit comprises a frame-shaped unit body, a first drive frame accommodated inside the unit body, and a second drive frame accommodated inside the first drive frame and fixed in the vicinity of the recording portion of the recording medium, and wherein the first drive frame freely moves with respect to the unit body by means of micro-driving elements in an in-plane direction of the recording medium, and the second drive frame freely moves with respect to the first drive frame by means of micro-driving elements in an in-plane direction of the recording medium, in a direction substantially perpendicular to the direction in which the first drive frame moves, so that the recording medium is minutely moved in an in-plane direction of the recording medium by moving the first drive frame and the second drive frame with respect to each other, and wherein the second drive frame includes air holes disposed substantially perpendicular to the recording medium and the second drive frame is fixed to or isolated from the recording medium by air aspirated or ejected through the air holes.

2. The high precision positioning apparatus according to claim 1, wherein the first drive frame moves linearly and rotates with respect to the unit body by means of two micro-driving elements, and the second drive frame moves linearly and rotates with respect to the first drive frame means of two micro-driving elements.

3. The high precision positioning apparatus according to claim 2, wherein the first drive frame is connected to the unit body by elastic bodies and the second drive frame is connected to the first drive frame by other elastic bodies.

4. The high precision positioning apparatus according to claim 1, wherein the optical system includes an optical reference block that defines a predetermined position of the recording portion, and the optical reference block includes air holes disposed substantially perpendicular to the recording medium, and the optical reference block is fixed to or isolated from the recording medium by the air aspirated or ejected through the air holes.

* * * * *